(12) United States Patent
Chaghooshi et al.

(10) Patent No.: US 10,481,803 B2
(45) Date of Patent: Nov. 19, 2019

(54) LOW WRITE OVERHEAD CONSENSUS PROTOCOL FOR DISTRIBUTED STORAGE

(71) Applicant: Western Digital Technologies, Inc., San Jose, CA (US)

(72) Inventors: Arman Fazeli Chaghooshi, La Jolla, CA (US); Lluis Pamies-Juarez, San Jose, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 91 days.

(21) Appl. No.: 15/626,061

(22) Filed: Jun. 16, 2017

(65) Prior Publication Data

US 2018/0364921 A1  Dec. 20, 2018

(51) Int. Cl.
| | |
|---|---|
| *G06F 12/00* | (2006.01) |
| *G06F 3/06* | (2006.01) |
| *H04L 29/08* | (2006.01) |
| *G06F 16/27* | (2019.01) |

(52) U.S. Cl.
CPC ............ *G06F 3/0613* (2013.01); *G06F 3/065* (2013.01); *G06F 3/067* (2013.01); *G06F 3/0619* (2013.01); *G06F 3/0659* (2013.01); *G06F 16/273* (2019.01); *H04L 67/1097* (2013.01)

(58) Field of Classification Search
CPC ......... G06F 3/0613; G06F 3/067; G06F 16/27
See application file for complete search history.

(56) References Cited

U.S. PATENT DOCUMENTS

| | | |
|---|---|---|
| 5,864,655 A | 1/1999 | Dewey |
| 6,996,752 B2 | 2/2006 | Hetrick |
| 8,103,939 B2 | 1/2012 | Torigoe |
| 8,443,264 B2 | 5/2013 | Suganuma |
| 8,453,036 B1 | 5/2013 | Goel et al. |
| 8,549,381 B2 | 10/2013 | Kitahara et al. |
| 8,549,388 B2 | 10/2013 | Fukutomi et al. |
| 9,230,000 B1 | 1/2016 | Hsieh et al. |
| 9,838,043 B2 | 12/2017 | Miyamae |
| 2012/0072811 A1 | 3/2012 | Fukutomi et al. |

(Continued)

OTHER PUBLICATIONS

International Search Report & Written Opinion, PCT/US2018/020814, dated May 30, 2018, pp. 1-13.

(Continued)

*Primary Examiner* — Baboucarr Faal
(74) *Attorney, Agent, or Firm* — Patent Law Works LLP

(57) ABSTRACT

Technology is provided for updating a data set in a data storage system. In an example data storage system, the system stores a separate copy of an initial data set on each one of a plurality of storage devices, one of which is designated as a leader storage device. The system receives update data and transmits it to each other one of the plurality of replica storage devices. The system updates the copy of the initial data set stored on a replica storage device based on the updated data, resulting in an updated data set and adds a provisional marker to the updated data set. The system transmits an update notification to each of the other replica storage devices. Responsive to determining that update notifications have been received from a threshold number of replica storage, the system removes the provisional marker from the updated data set.

20 Claims, 5 Drawing Sheets

(56) References Cited

U.S. PATENT DOCUMENTS

2013/0110774 A1    5/2013  Shah et al.
2017/0032010 A1*  2/2017  Merriman ......... G06F 17/30289
2017/0270176 A1*  9/2017  Horowitz .......... G06F 17/30371

OTHER PUBLICATIONS

Paxos (computer science), Wikipedia Page, Jul. 5, 2017. p. 1-9, https://en.wikipedia.org/wiki/Paxi.

* cited by examiner

LOW WRITE OVERHEAD CONSENSUS PROTOCOL FOR DISTRIBUTED STORAGE

TECHNICAL FIELD

The present disclosure generally relates to distributed storage systems. In a more particular non-limiting example, the present disclosure relates to using low write overhead consensus protocols to efficiently store data in distributed storage systems.

BACKGROUND

The rise in electronic and digital device technology has rapidly changed the way society communicates, interacts, and consumes goods and services. Digital technology enables a variety of electronic devices to be available that can be used for a variety of purposes and are relatively cheap. Specifically, modern electronic devices, such as desktop computers, laptops, smart phones, and tablets, allow a user to have access to a variety of useful applications in many locations. Using such applications results in the generation of a large amount of data. Storing and retrieving the produced data is a significant challenge associated with providing useful applications and devices.

The data generated by online services can be stored at data storage facilities remote from any particular user. As the number of users grows so too does the amount of stored data. Having a large userbase sending and requesting data can result in complications that reduce efficiency and speed. As a counter measure, reducing the number of write operations used to store data can improve the overall functioning of the data storage system significantly.

SUMMARY

The present disclosure generally relates to using log-free low write overhead consensus protocol for distributed storage. For instance, the disclosure describes technology capable of storing a separate copy of an initial data set on each one of a plurality of replica storage devices, one of which is designated as a leader storage device, receiving, at the leader storage device, update data from a client system, transmitting the update data from the leader storage device to each other one of the plurality of replica storage devices, at a particular replica storage device other than the leader storage device in the plurality of replica storage devices, updating a copy of the initial data set stored on the particular replica storage device based on the update data, resulting in an updated data set, adding a provisional marker to the updated data set stored on the particular replica storage device, transmitting an update notification to each other one of the plurality of replica storage devices in the plurality of replica storage devices, determining that update notifications have been received by the particular replica storage device from at least a threshold number of replica storage devices in the plurality of replica storage devices, responsive to determining that update notifications have been received by the particular replica storage device from at least the threshold number of replica storage devices in the plurality of replica storage devices, removing the provisional marker from the updated data set stored on the particular replica storage device, determining, at the leader storage device, that update notifications have been received from at least the threshold number of replica storage devices in the plurality of replica storage devices, updating the copy of the initial data set stored at the leader storage device to the updated data set.

These and other implementations may optionally include one or more of the following features, such as, but not limited to: that the threshold number of replica storage devices is based on a total number of replica storage devices; that the threshold number of replica storage devices is a majority of replica storage devices, determining that the designated leader storage device has failed, selecting a candidate replica storage device in the plurality of replica storage devices, designating the candidate replica storage device as a new leader storage device, that a new leader storage device is selected from replica storage devices that have been updated and do not include the provisional marker, that a new leader storage device is selected from replica storage devices that have not been updated and do not include the provisional marker, determining that all replica devices include a provisional marker, selecting a new leader storage device from the replica devices that include the provisional marker, that the leader storage device is predetermined, that the leader storage device is designated based at least in part on one of: a location of at least one client system, a portion of the initial data set being updated, and a workload associated with the plurality of replica storage devices, that the data storage system does not use update logs during while updating data stored on the plurality of replica storage devices.

Other aspects include corresponding methods, systems, apparatus, and computer program products for these and other innovative aspects.

Note that the above list of features is not all-inclusive and many additional features and advantages are contemplated and fall within the scope of the present disclosure. Moreover, the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
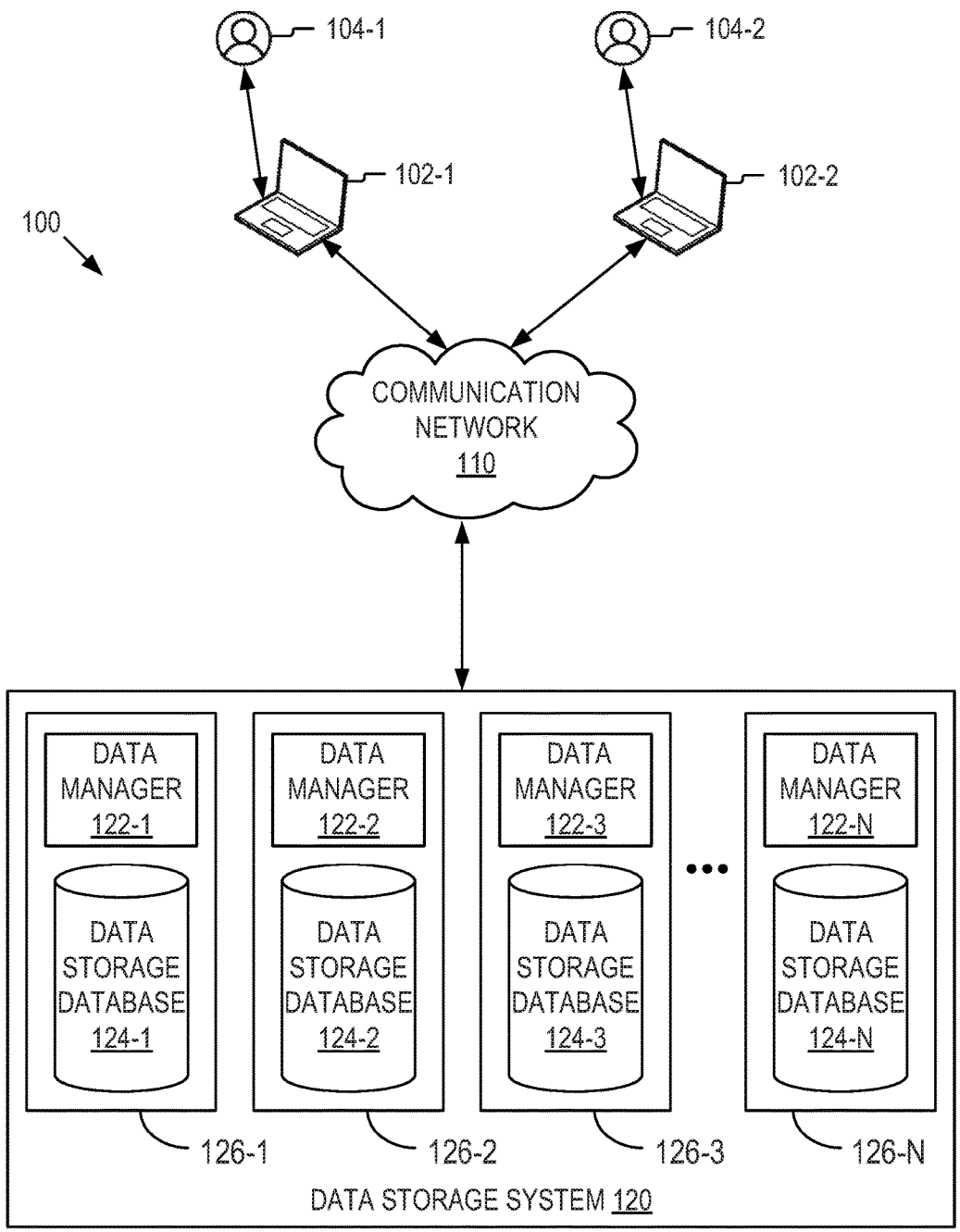
FIG. 1 is a network diagram depicting a client-data storage system environment that includes various functional components of a server system, in accordance with some example embodiments.

The present disclosure describes technology, which may include methods, systems, apparatuses, computer program products, and other aspects, for updating data in a distributed data storage system without the use of update logs. In the following description, for purposes of explanation, numerous specific details are set forth to provide a thorough understanding of the various aspects of different example embodiments. Note that any particular example embodiment may in various cases be practiced without all of the specific details and/or with variations, permutations, and combinations of the various features and elements described herein.

As a non-limiting overview of the technology, a data storage system may be comprised of a plurality of storage devices, each maintaining a copy of a set of data. The plurality of storage devices may provide redundant copies of the stored set of data and increased accessibility to users in multiple locations. To be useful and consistent, the plurality of storage devices provides data that matches a consensus version of the data set. In this way, a user may be guaranteed to have a consistent experience regardless of from which particular data storage device the content is retrieved for the user.

To provide this service the data storage system synchronizes the updating process of the data set on the multiple storage devices before any of the storage systems can mark the update as final. One conventional method of ensuring synchronization of data updates includes using a corresponding update log for each data storage system. Updates are first written to update logs corresponding to given devices, and only subsequently committed to the device themselves. In other words, the update log may initially record data that is later used to make changes to data stored on the corresponding data storage system. Writing to the temporary logs and again to the storage devices of the storage systems involves at least two data writes for each storage device updated, which results in the use of extra time and resources.

To avoid using update logs and thus writing data twice for each device per update, the data storage system selects a leader storage device from the plurality of storage devices. The storage device leader storage device may transmit update messages to the plurality of the storage devices in the data storage systems. Each of the plurality of storage devices provisionally updates the copy of the data set stored in its data storage database, and includes a provisional marker (e.g., a flag) to denote that the updated data is not yet committed or live. As a storage device provisionally updates the data set, it will transmit update notifications to the other storage devices that are in the data storage system.

Once the leader storage device receives update notifications from a threshold number of storage devices (e.g., a quorum), the data read storage device may update the data set stored at the data read storage device to the update data set. Also, when a particular storage device receives update notifications from a threshold number of other storage devices, the particular storage device will remove the provisional marker from the updated data. The updates are then committed on that given device and will be used to respond to client data requests.

FIG. 1 is a network diagram depicting a client-server system environment 100 that includes various functional components of a data storage system 120, in accordance with some example embodiments. Note that when there are multiple instances of a similar element are depicted they will be labeled with the same reference number followed by a dash ("-") and another number or letter (e.g., 112-3) to designate different instances. In the event a reference numeral appears in the text without a dash and subsequent number or letter, for example, "112," it is used as a general reference to a generic instance of the element or component bearing that general reference numeral. For example, client systems 102-1 and 102-2 are included in FIG. 1, but the reference number 102 may be used to reference a generic client system.

The client-server system environment 100 includes two or more client systems 102-1 and 102-2 and the data storage system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

The client systems 102-1 and 102-2 may include electronic devices, such as a personal computer (PC), a laptop, a smartphone, a tablet, a mobile phone, a wearable electronic device or any other electronic device capable of communication with the communication network 110. The client system 102 may include one or more client applications, which are executed by the client system 102. In some example embodiments, the client applications include one or more applications such as search applications, communication applications, productivity applications, game applications, word processing applications, or any other useful applications. The client applications may include a web browser. A client system 102 may use a web browser to send and receive requests to and from the data storage system 120 and to display information received from the data storage system 120.

A client system (102-1 or 102-2) may be associated with a particular user (104-1 or 104-2) that operates the client system (102-1 or 102-2) and uses one or more client applications installed on the client system 102-1 or 102-2. A client system 102 may include an application specifically customized for communication with the data storage system 120 (e.g., an application associated with the server system).

A client system 102 may send a request to the data storage system 120 to store, update, delete, or retrieve a particular file or files stored at the data storage system 120 through the communication network 110. For example, a user 104 updates a document using a work processing application and wishes to save the updated version to the data storage system 120, the user uses an application on the client system 102 to transmit a request to store the updated version of the document as well as the updated document itself. Similarly, a user may request a particular version of a file or object and receive, from the data storage system 120, the requested version of a file or object.

As shown in FIG. 1, the data storage system 120 may include a plurality of data storage devices 126-1 to 126-N. A data storage device 126-1 to 126-N may include a data manager 122-1 to 122-N and a data storage database 124-1. The data manager 122-1 may receive requests to store or retrieve data, update already stored data, transmit notifications that updates have been stored, and so on. The data storage database 124-1 to 124-N may store a copy of a data set that is also stored on one or more other data storage systems.

In some example embodiments, one of the data storage devices is selected or designated as having a special status according to which that device coordinates updates among the rest of the data storage replicas. The selected device with the special status may be referred to herein as the "leader storage device." Thus, in some example embodiments, the plurality of data storage devices 126-1 to 126-N act as replicas that maintain availability and help guard against data loss. In some embodiments, the leader storage device may be selected based on proximity to the user or client, the specific data being requested or stored, network performance, and so on.

In some example embodiments, a designated leader storage device (e.g., one of the data storage devices 126-1 to 126-N) would receive an update to the stored data set (which is replicated in the data storage database 124-1 to 124-N of the other data storage devices 126-1 to 126-N) requested by a client system 102 or other source in the form of a write operation. To ensure that the data set at the leader storage device and the replica data storage devices remains consistent, the leader storage device (e.g., selected from one of 126-1 to 126-N) may not commit (e.g., finalize) the new update until a threshold number of replica data storage devices (e.g., a given number or percentage of devices from 126-1 to 126-N) respond with a notification that the update had been made on their respective data storage databases (124-1 to 124-N). The threshold number of devices may also be referred to herein as a quorum. It is to be understood that the percentage of storage devices that constitute a quorum is a variable design parameter. In some example embodiments, a majority of storage devices in the data storage system 120 would constitute a quorum.

In some example embodiments, the response from the replica devices may also include a promise to not accept any updates older than the current update. For example, if each update is numbered, and the current update number is 26, the replica device would confirm that the device will disregard any received requested data update with an update number lower than 26. In this way, if a given replica device missed a particular update, it will not accept that missed update after a later update had already been accepted.

In some example embodiments, when a replica device (e.g., one or more of 126-1 to 126-N) receives a data update from the leader storage device, the replica updates the data set stored in an associated data storage database (124-1 to 124-N) and includes a provisional marker to indicate that the update has not yet been committed. In some example embodiments, the provisional marker is a flag that is set to indicate that the data set updates have not been committed.

The replica may also transmit an update notification to the other data storage devices (including the leader storage device) once the data set in its respective data storage database 124 has been updated and marked provisional. Once a replica device has received update notifications from a threshold number (quorum) of replica devices, it determines that the updated data set is ready to be committed and removes the provisional marker. Similarly, once the leader storage device receives a threshold number of update notifications, it may also update the data set stored in its associated data storage database to the updated data set.

Figure 2:
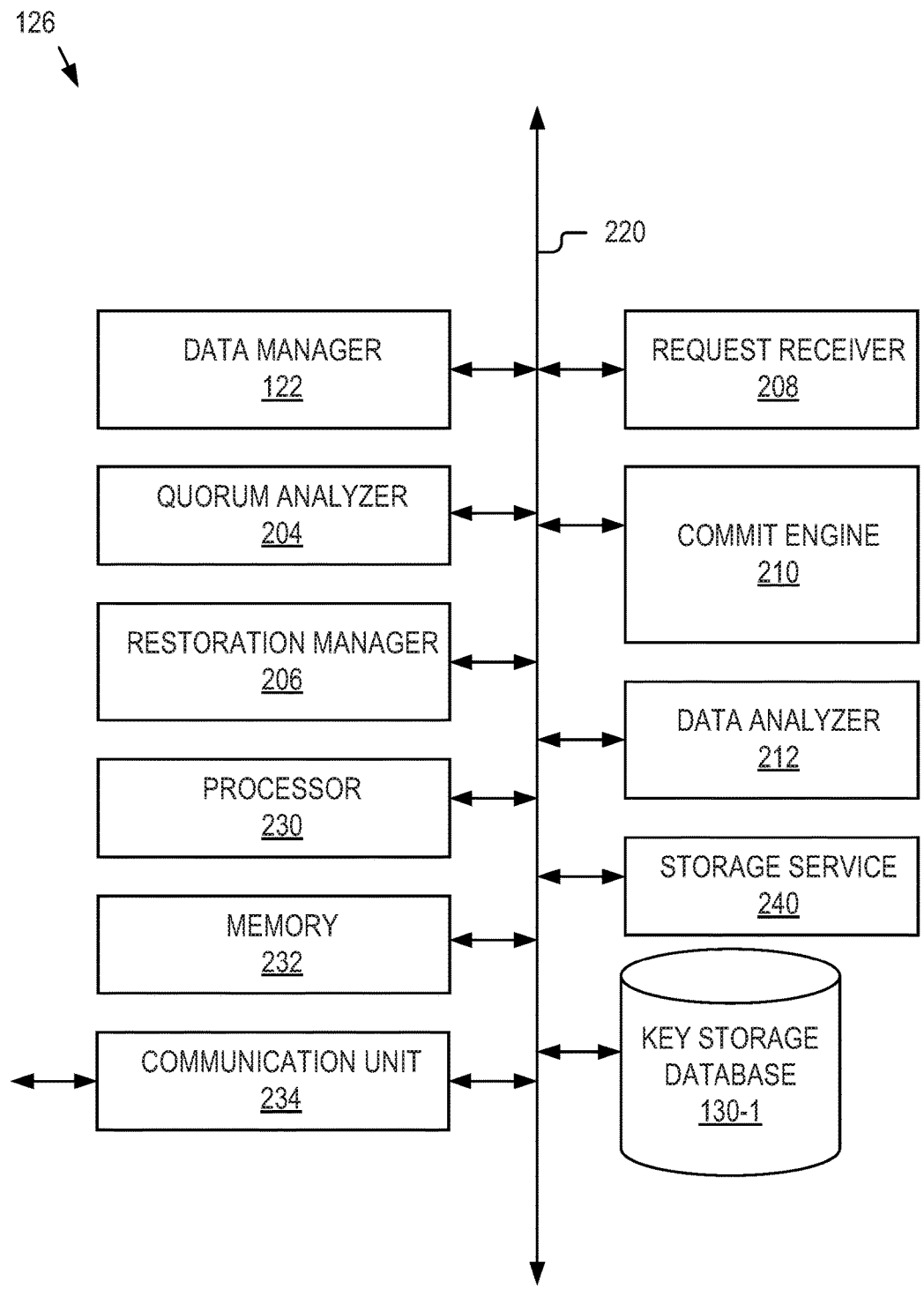
FIG. 2 is a block diagram of an example data storage device.

FIG. 2 is a block diagram of an example data storage device 126. While the data storage device 126 is shown as a single system or machine, it is appreciated that the acts and/or functionality described with respect to the data storage device 126 may be embodied in a plurality of different computing devices connected over a wide geographic area. Thus, while the functionality of data storage device 126 may be split amongst more than one computer device, for simplicity in description, the functionality is often described as a single system and thus is illustrated as such in this description.

The data storage device 126 may include a processor 230, memory 232, a communication unit 234, a storage service 240, a data manager 122, a quorum analyzer 204, a restoration manager 206, a request receiver 208, a commit engine 210, a data analyzer 212, and a data storage database 124. In some implementations, the components of the data storage device 126 are communicatively coupled by a bus 220.

The processor 230 includes an arithmetic logic unit, a microprocessor, a general-purpose controller, or some other processor array to perform computations and provide electronic display signals to a display device. The processor 230 is coupled to the bus 220 for communication with the other components. Processor 230 processes data signals and may include various computing architectures including a complex instruction set computer (CISC) architecture, a reduced instruction set computer (RISC) architecture, or an architecture implementing a combination of instruction sets. Although FIG. 2 depicts a single processor 230, multiple processors may be encompassed by the processor 230. Further processors, operating systems, sensors, displays and physical configurations are possible.

The memory 232 includes one or more non-transitory computer-readable media. The memory 232 stores instructions and/or data that may be executed by the processor 230. The memory 232 is coupled to the bus 220 for communication with the other components. The instructions and/or data may include code for performing the techniques described herein. The memory 232 may be a dynamic random-access memory (DRAM) device, a static random-access memory (SRAM) device, flash memory, or some other memory device. In some instances, the memory 232 also includes a non-volatile memory or similar permanent storage device and media including a hard disk drive, a floppy disk drive, a CD ROM device, a DVD ROM device, a DVD RAM device, a DVD RW device, a flash memory device, or some other mass storage device for storing information on a more permanent basis.

The communication unit 234 transmits and receives data to and from the network 110. The communication unit 234 is coupled to the bus 220. In some instances, the communication unit 234 includes a port for direct physical connection to the network 110 or to another communication channel. For example, the communication unit 234 includes a USB, SD, CAT-6 or similar port for wired communication with the network 110. In some instances, the communication unit 234 includes a wireless transceiver for exchanging data with the network 110 or other communication channels using one or more wireless communication methods, including IEEE 802.11, IEEE 802.16, BLUETOOTH® or another suitable wireless communication method. Although FIG. 2 includes a communication unit 234, multiple communication units 234 may be included.

In some instances, the communication unit 234 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some instances, the communication unit 234 includes a wired port and a wireless transceiver. The communication unit 234 also provides other connections to the network 110 for distribution of files and/or media objects using network protocols including TCP/IP, HTTP, HTTPS, SSL, SMTP, and so on.

The storage service 240 can include software including routines for storing and retrieving data from the data storage database 124 under the direction of the data manager. The data storage database 124 includes a data set and an indication of whether the current data is provisional or not. In some instances, the data storage database 124 is implemented on a plurality of possible storage devices including but not limited to a non-volatile memory or similar permanent storage device and media including a hard disk drive, a floppy disk drive, a CD ROM device, a DVD ROM device, a DVD RAM device, a DVD RW device, a flash memory device, or some other mass storage device for storing information on a more permanent basis.

In the implementation shown in FIG. 2, the data storage device 126 includes a data manager 122. The data manager 122 receives a request to store or retrieve one or more portions of data in a stored data set. The data manager 122, when receiving instructions to update the stored data set from an original data set to an updated data set, may provisionally update the data set stored in the data storage database 124 and then transmit an update notification to a leader storage device and other data storage devices (e.g., replicas). The data manager 122 may also include a provisional marker to note the updates have been made provisionally.

The data manager 122 may also receive update notifications from other data storage devices. Once a threshold number of update notifications have been received, the data manager 122 will remove the provisional marker from the updated data and the update will be considered committed.

A quorum analyzer 204 may determine a threshold number of update notifications that, once received, constitutes a quorum and results in the removal of a provisional marker from an update stored at the data storage database 124. In some example embodiments, the threshold is a simple majority. In other embodiments, the threshold number is determined as a percentage of total replicas. In some example embodiments, the restoration manager 206 enables the data storage device 126 to repair incorrect or faulty data using coded data.

In some example embodiments, a request receiver 208 receives a request for data from a client system 102. In some example embodiments, the request receiver 208 may also receive data update requests, requests to provide backup data for a failed data storage device, and update notifications from replica devices.

In some example embodiments, a commit engine 210 tracks a number of update notifications received by the data storage device 126 and, when a threshold number has been reached, removes a provisional marker from an updated data set. Removing the provisional marker has the effect of committing the data as the current version of the data set for any future data retrieval requests. In some example embodiments, the data analyzer 212 uses existing coded data to authenticate the stored data and ensure that no errors have occurred.

Figure 3:
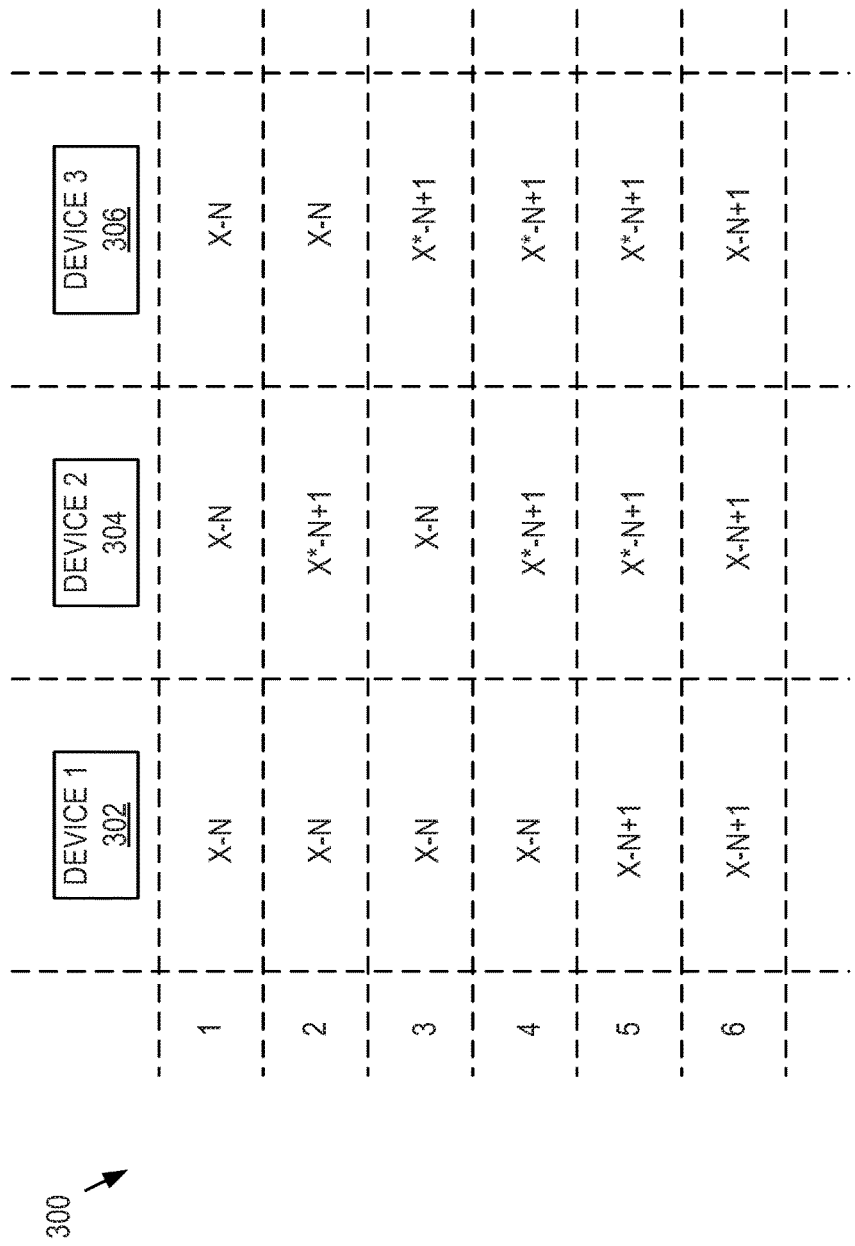
FIG. 3 is a diagram representing the state of one or more storage devices through a data update process without the use of update logs, in accordance with some example embodiment.

FIG. 3 is a diagram of a chart 300 representing the state of one or more storage devices through a data update process without the use of update logs, in accordance with some example embodiments. The version of the data set stored on a first device 302, a second device 304, and a third device 306 is represented through a series of update steps. In this example, device 1 302 is acting as a selected leader storage device that coordinates updating the data on device 2 204 and device 3 306, each of which store a copy of the data on the leader storage device.

In step 1, device 1 302, device 2 304 and device 3 306 store data set x−n (wherein n represents a particular version number of the data). In this example, device 1 302, acting as the leader storage device, receives an update to data set X. The new update is denoted x−n+1 (one version after the current version). Device 1 302, acting as the leader storage device, transmits the data update to device 2 304 and device 3 306.

Steps 2 and 3 represent two different possible orders the data update process may take based on which storage device receives the update first. Thus, step 2 and 3 should not be thought of as sequential steps. Instead, one of step 2 or step 3 will occur, but not both. In step 2, device 2 304 receives the data update first and updates its stored data set to x−n+1. In some example embodiments, a provisional marker is also added to the data to indicate that the update had not been finalized. This provisional marker is represented, in FIG. 3, as a '*' in the data set representation. Thus, FIG. 3 shows the provisional data update of device 2 in step 2 as x*−n+1.

Similarly, in step 3, device 3 306 receives the data update first and updates the data set stored in its associated data storage database 124 to x−n+1. Also, the data includes a provisional marker and thus the example in step 3 lists the data as x*−n+1.

In step 4, device 2 304 and device 3 306 have both received the data update and have each updated to data set x*−n+1 (which includes a provisional tag). Regardless of the order in which the devices receive the data update, once a device has done so it may send update notifications to the other storage devices including device 1 (which is acting as the leader storage device). The update notifications are not depicted.

In step 5, device 1, having received update notifications from a quorum of storage devices (in this example, device 2 304 and device 3 306), updates the data set stored in its associated data storage database 124 to an updated version of the data (shown as x−n+1). No provisional tag is displayed because the data has now been committed and will be readable by users.

In step 6, device 2 304 and device 3 306, having received update notifications from a quorum of storage devices (in this example, device 1 and each other), may remove the provisional marker from the updated data set, now having the updated data committed (shown here as x−n+1). It is to be understood that although only three devices are depicted in FIG. 3, in practice a data storage system (e.g., data storage system 120 in FIG. 1) may include a large number of storage devices.

Figure 4A:
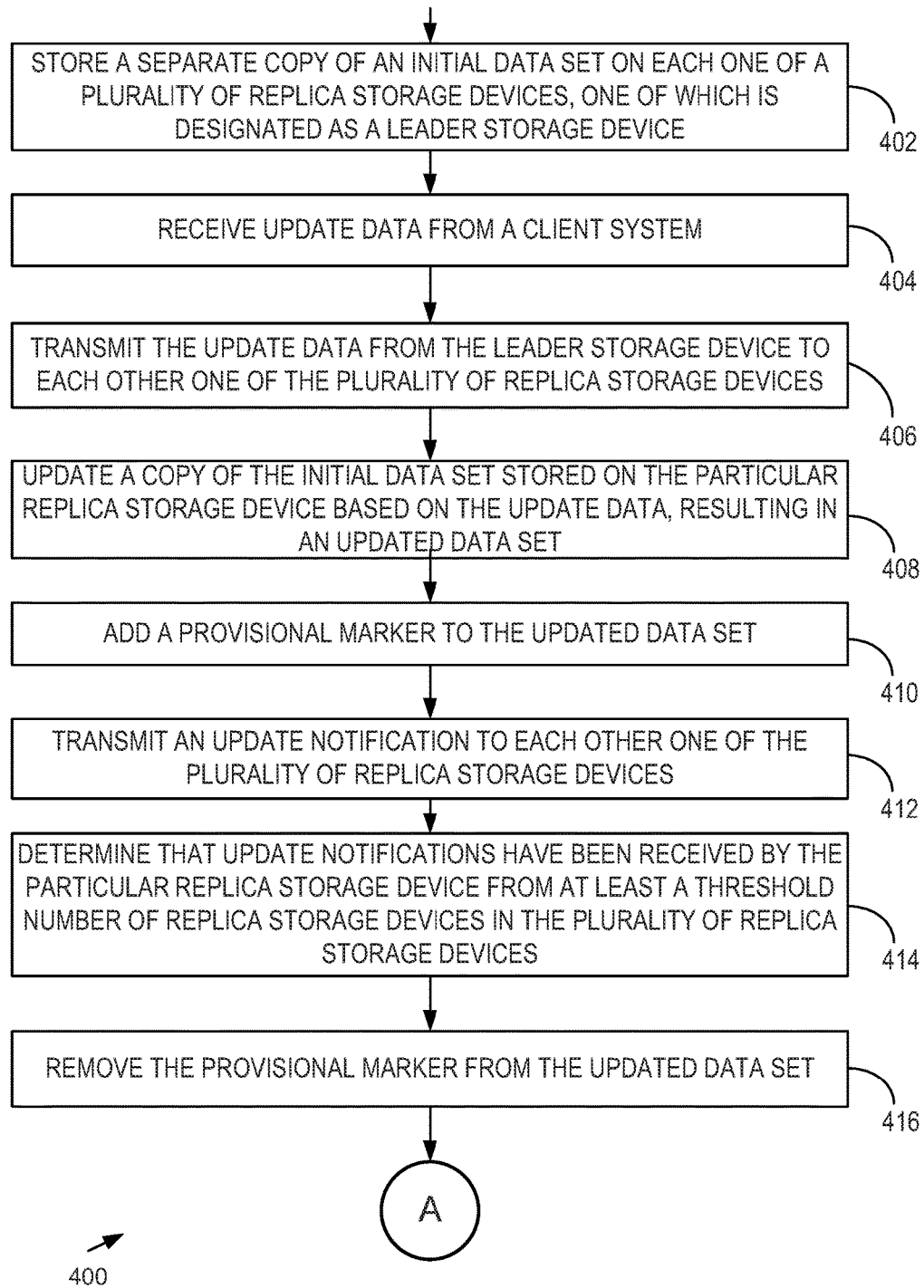
FIGS. 4A and 4B are flow charts of an example method for updating data in a distributed data storage system without the use of update logs.

FIG. 4A is a flow chart of an example method 400 for updating data in a distributed data storage system without the use of update logs. The operations shown in FIG. 4A may correspond to instructions stored in a computer memory or one or more computer-readable storage media. In some embodiments, the method described in FIG. 4A is performed by the data storage system (e.g., data storage system 120 in FIG. 1).

The method illustrated by the figure is performed on or by a data storage system (e.g., data storage system 120 in FIG. 1) including one or more processors and memory storing one or more programs for execution by the one or more processors.

In some example embodiments, the data storage system (e.g., data storage system 120 in FIG. 1) may store (402) a plurality of copies of an initial data set on a plurality of storage devices, including a designated leader storage device and a plurality of replica storage devices. The leader storage device may facilitate the co-ordination of updates on the storage devices associated with the data storage system. In some example embodiments, the leader storage device is predetermined by the data storage system (e.g., data storage system 120 in FIG. 1). In other embodiments, the leader storage device is determined based on the data to be updated (e.g., different storage devices may be associated with particular sections of the data set), the location of the one or more of the client systems (e.g., client system 102 in FIG. 1), availability of the storage devices, and so on.

In some example embodiments, the data storage system (e.g., data storage system 120 in FIG. 1) may receive (404), at the leader storage device, updated data from a client system (e.g., client system 102 in FIG. 1). This update data typically represents a write operation by a client system (e.g., client system 102 in FIG. 1) or other entity. The data storage system (e.g., data storage system 120 in FIG. 1) may transmit (406) the update data (or a message that includes information necessary to update the data set) from the leader storage device to the plurality of replica storage devices.

The data storage system (e.g., data storage system 120 in FIG. 1) may update (408) a copy of the initial data set stored at a particular replica storage device based on the update data to create an updated data set. The data storage system (e.g., data storage system 120 in FIG. 1) may add (410) a provisional marker to the updated data set on the given storage device. In some example embodiments, the provisional marker may be a flag set in the replica device.

The replica device may transmit (412) an update notification to the other replica storage devices including the leader storage device. Note that, the replica device may also receive update notifications from other replica devices as those replica devices receive the update data set. In some example embodiments, the given storage device may determine (414) that update notifications have been received from at least a threshold number of replica storage devices in the plurality of replica storage devices.

In some example embodiments, the threshold number of replica storage devices may be based on the total number of replica storage devices. In other embodiments, the threshold number of replica storage devices may be a majority of replica storage devices.

Responsive to determining that update notifications have been received from at least a threshold number of replica storage devices in the plurality of replica storage devices, the given storage device may remove (416) the provisional marker from the updated data set. Removing the provisional marker effectively commits the update data to that replica device.

Figure 4B:
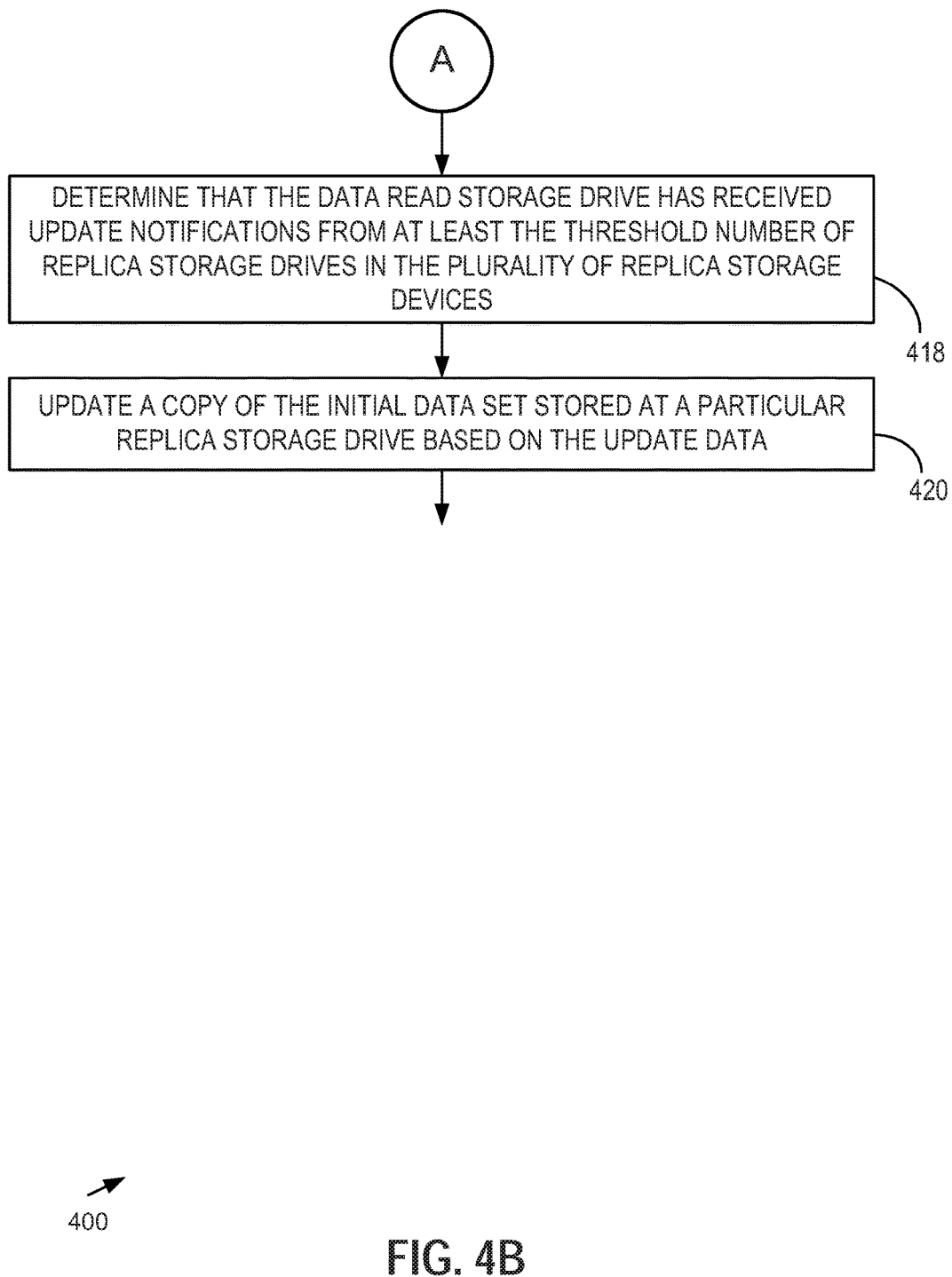

FIG. 4B is a flow chart of an example method 400 for updating data in a distributed data storage system without the use of update logs. The operations shown in FIG. 4B may correspond to instructions stored in a computer memory or computer-readable storage medium. In some embodiments, the method described in FIG. 4B is performed by the data storage system (e.g., data storage system 120 in FIG. 1). FIG. 4B continues the method shown in FIG. 4A.

The method illustrated by the figure is performed on or by a data storage system (e.g., data storage system 120 in FIG. 1) including one or more processors and memory storing one or more programs for execution by the one or more processors.

The data storage system (e.g., data storage system 120 in FIG. 1) may determine (418) that the leader storage device has received update notifications from at least the threshold number of replica storage devices in the plurality of replica storage devices.

In some example embodiments, the leader storage device may update (420) its copy of the initial data set stored at the leader storage device to the updated data set, thereby committing the update.

In some example embodiments, the data storage system (e.g., data storage system 120 in FIG. 1) may determine that the leader storage device has failed. In this case, the data storage system may select, as a candidate, a respective replica storage device in the plurality of replica storage devices to become the new leader storage device, and designate the selected candidate device as such. In some example embodiments, the new leader storage device may be selected from those replica storage devices that have updated to the most recently committed update and do not include a provisional marker. In other embodiments, the new lead storage device may be selected from storage devices that have not yet updated their respective data sets (and thus do not have a provisional marker.)

In some example embodiments, the data storage system may determine that all replica devices include a provisional marker or that none of the replica devices do. In response, the data storage system (e.g., data storage system 120 in FIG. 1) may select any of the replica devices as the new leader storage device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

Note that, although the terms "first," "second," and so forth may be used herein to describe various elements, these elements are not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. Also note that the term "and/or" as used herein refers to and encompasses any and/or all possible combinations of one or more of the associated listed items. Furthermore, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A computer-implemented method comprising:
   storing a separate copy of an initial data set on each one of a plurality of replica storage devices, one of which is designated as a leader storage device;
   receiving, at the leader storage device, update data from a client system;
   transmitting the update data from the leader storage device to each other one of the plurality of replica storage devices;
   at a plurality of particular replica storage devices other than the leader storage device in the plurality of replica storage devices:
      updating a copy of the initial data set stored on each particular replica storage device based on the update data, resulting in an updated data set;
      adding a provisional marker to the updated data set stored on each particular replica storage device;
      transmitting an update notification to each other one of the plurality of replica storage devices in the plurality of replica storage devices;
      determining, by each particular replica storage device, that update notifications have been received from at least a threshold number of replica storage devices in the plurality of replica storage devices; and
      responsive to each particular replica storage device determining that the update notifications have been received from at least the threshold number of replica storage devices in the plurality of replica storage devices, removing the provisional marker from the updated data set stored on each particular replica storage device;
   determining, at the leader storage device, that the update notifications have been received from at least the threshold number of replica storage devices in the plurality of replica storage devices; and
   updating the copy of the initial data set stored at the leader storage device to the updated data set.

2. The computer-implemented method of claim 1, wherein the threshold number of replica storage devices is based on a total number of replica storage devices in the plurality of replica storage devices.

3. The computer-implemented method of claim 1, wherein the threshold number of replica storage devices is a majority of replica storage devices in the plurality of replica storage devices.

4. The computer-implemented method of claim 1, further comprising:
   determining that the leader storage device has failed;
   selecting a candidate replica storage device from the plurality of replica storage devices; and
   designating the candidate replica storage device as a new leader storage device.

5. The computer-implemented method of claim 4, wherein the candidate replica storage device is selected from replica storage devices in the plurality of replica storage devices that have been updated and do not include the provisional marker.

6. The computer-implemented method of claim 4, wherein the candidate replica storage device is selected from replica storage devices in the plurality of replica storage devices that have not been updated and do not include the provisional marker.

7. The computer-implemented method of claim 4, further comprising:
   determining that all replica devices in the plurality of replica storage devices include the provisional marker; and
   selecting the candidate replica storage device from the replica devices in the plurality of replica storage devices that include the provisional marker.

8. The computer-implemented method of claim 1, wherein the leader storage device is predetermined.

9. The computer-implemented method of claim 1, wherein the leader storage device is designated based at least in part on one of: a location of at least one client system, a portion of the initial data set being updated, and a workload associated with the plurality of replica storage devices.

10. The computer-implemented method of claim 1, wherein the update data is included as part of a requested write operation.

11. The computer-implemented method of claim 1, wherein the method does not use update logs while updating data stored on the plurality of replica storage devices.

12. A data storage system comprising:
   one or more computer processors; and
   storage logic including a data manager that, when executed by the one or more computer processors, performs operations comprising:
      storing a separate copy of an initial data set on each one of a plurality of replica storage devices, one of which is designated as a leader storage device;
      receiving, at the leader storage device, update data from a client system;

transmitting the update data from the leader storage device to each other one of the plurality of replica storage devices;
at a plurality of particular replica storage devices other than the leader storage device in the plurality of replica storage devices:
updating a copy of the initial data set stored on each particular replica storage device based on the update data, resulting in an updated data set;
adding a provisional marker to the updated data set stored on each particular replica storage device;
transmitting an update notification to each other one of the plurality of replica storage devices in the plurality of replica storage devices;
determining, by each particular replica storage device, that update notifications have been received from at least a threshold number of replica storage devices in the plurality of replica storage devices; and
responsive to each particular replica storage device determining that the update notifications have been received from at least the threshold number of replica storage devices in the plurality of replica storage devices, removing the provisional marker from the updated data set stored on each particular replica storage device;
determining, at the leader storage device, that the update notifications have been received from at least the threshold number of replica storage devices in the plurality of replica storage devices; and
updating the copy of the initial data set stored at the leader storage device to the updated data set.

13. The data storage system of claim 12, wherein the threshold number of replica storage devices is based on a total number of replica storage devices in the plurality of replica storage devices.

14. The data storage system of claim 12, wherein the threshold number of replica storage devices is a majority of replica storage devices in the plurality of replica storage devices.

15. The data storage system of claim 12, wherein the operations further comprise:
determining that the designated leader storage device has failed;
selecting a candidate replica storage device in the plurality of replica storage devices; and
designating the candidate replica storage device as a new leader storage device.

16. The data storage system of claim 15, wherein the candidate replica storage device is selected from replica storage devices in the plurality of replica storage devices that have been updated and do not include a provisional marker.

17. The data storage system of claim 12, wherein the leader storage device is predetermined.

18. A system comprising:
means for storing a separate copy of an initial data set on each one of a plurality of replica storage devices, one of which is designated as a leader storage device;
means for receiving, at the leader storage device, update data from a client system;
means for transmitting the update data from the leader storage device to each other one of the plurality of replica storage devices;
at a plurality of particular replica storage devices other than the leader storage device in the plurality of replica storage devices:
means for updating a copy of the initial data set stored on each particular replica storage device based on the update data, resulting in an updated data set;
means for adding a provisional marker to the updated data set stored on each particular replica storage device;
means for transmitting an update notification to each other one of the plurality of replica storage devices in the plurality of replica storage devices;
means for determining, by each particular replica storage device, that update notifications have been received from at least a threshold number of replica storage devices in the plurality of replica storage devices; and
means for, responsive to each particular replica storage device determining that the update notifications have been received from at least the threshold number of replica storage devices in the plurality of replica storage devices, removing the provisional marker from the updated data set stored on each particular replica storage device;
means for determining, at the leader storage device, that the update notifications have been received from at least the threshold number of replica storage devices in the plurality of replica storage devices; and
means for updating the copy of the initial data set stored at the leader storage device to the updated data set.

19. The system of claim 18, wherein the threshold number of replica storage devices is based on a total number of replica storage devices in the plurality of replica storage devices.

20. The system of claim 18, wherein the threshold number of replica storage devices is a majority of replica storage devices in the plurality of replica storage devices.

* * * * *